United States Patent Office 3,274,956
Patented Sept. 27, 1966

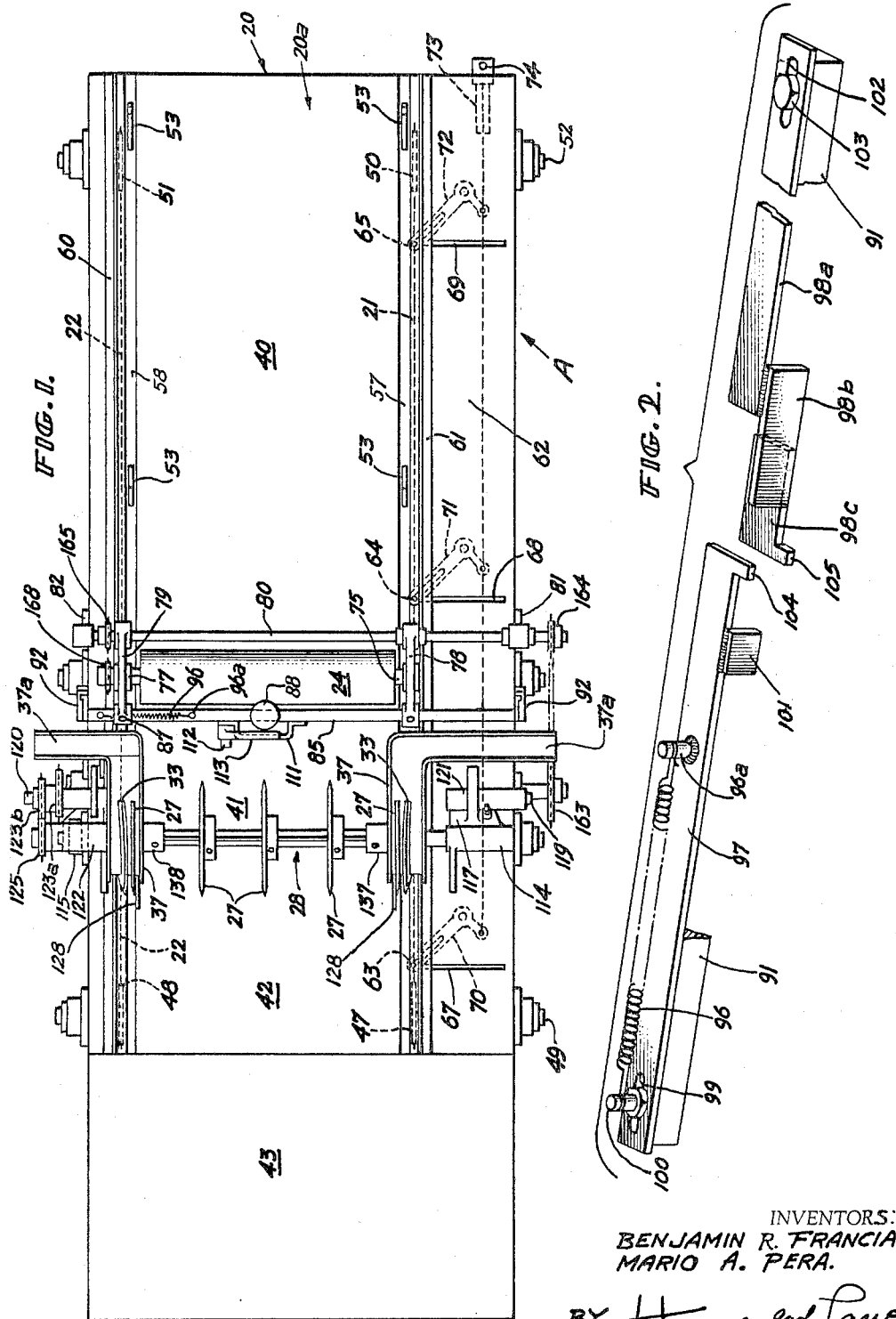

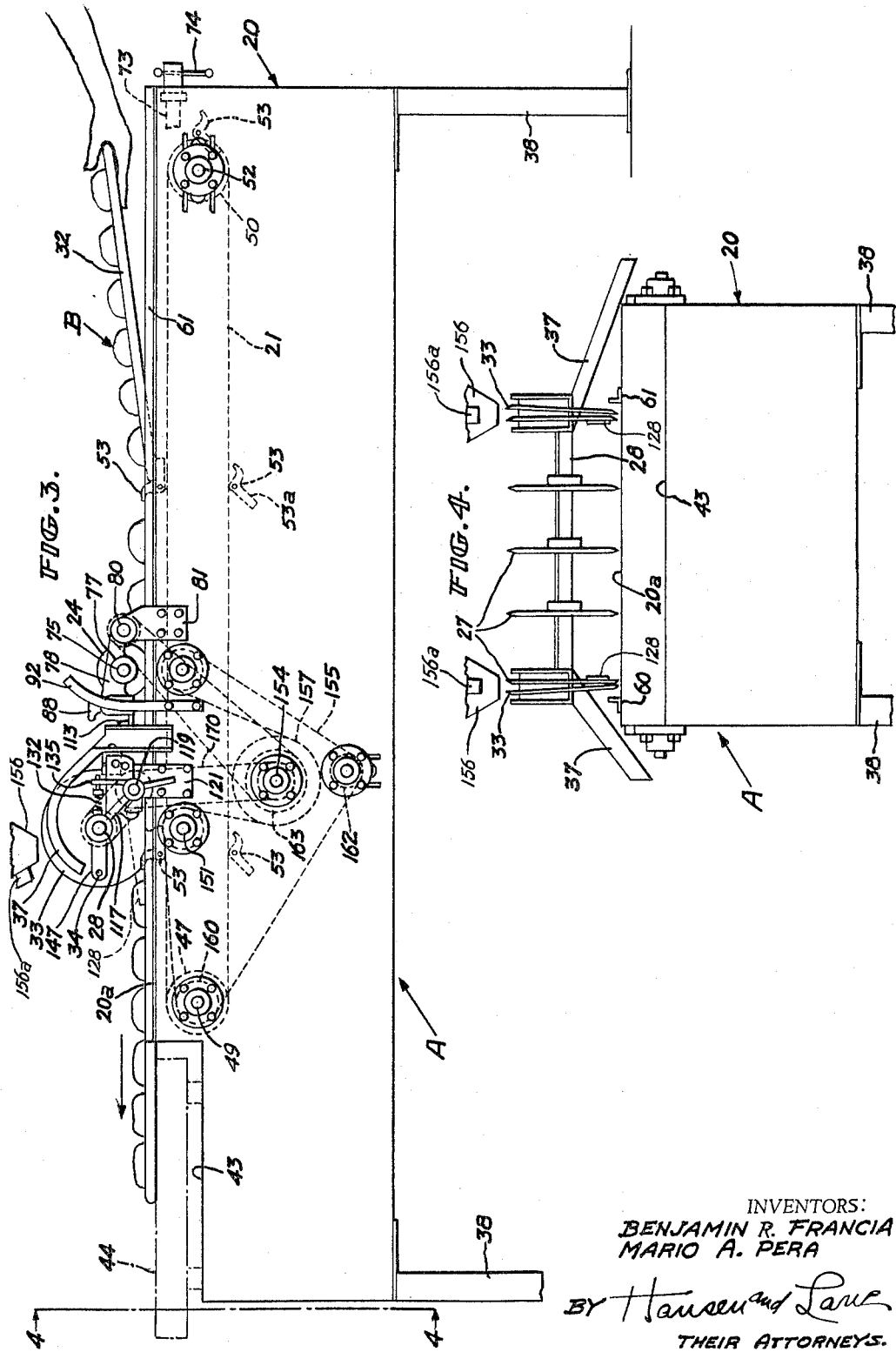

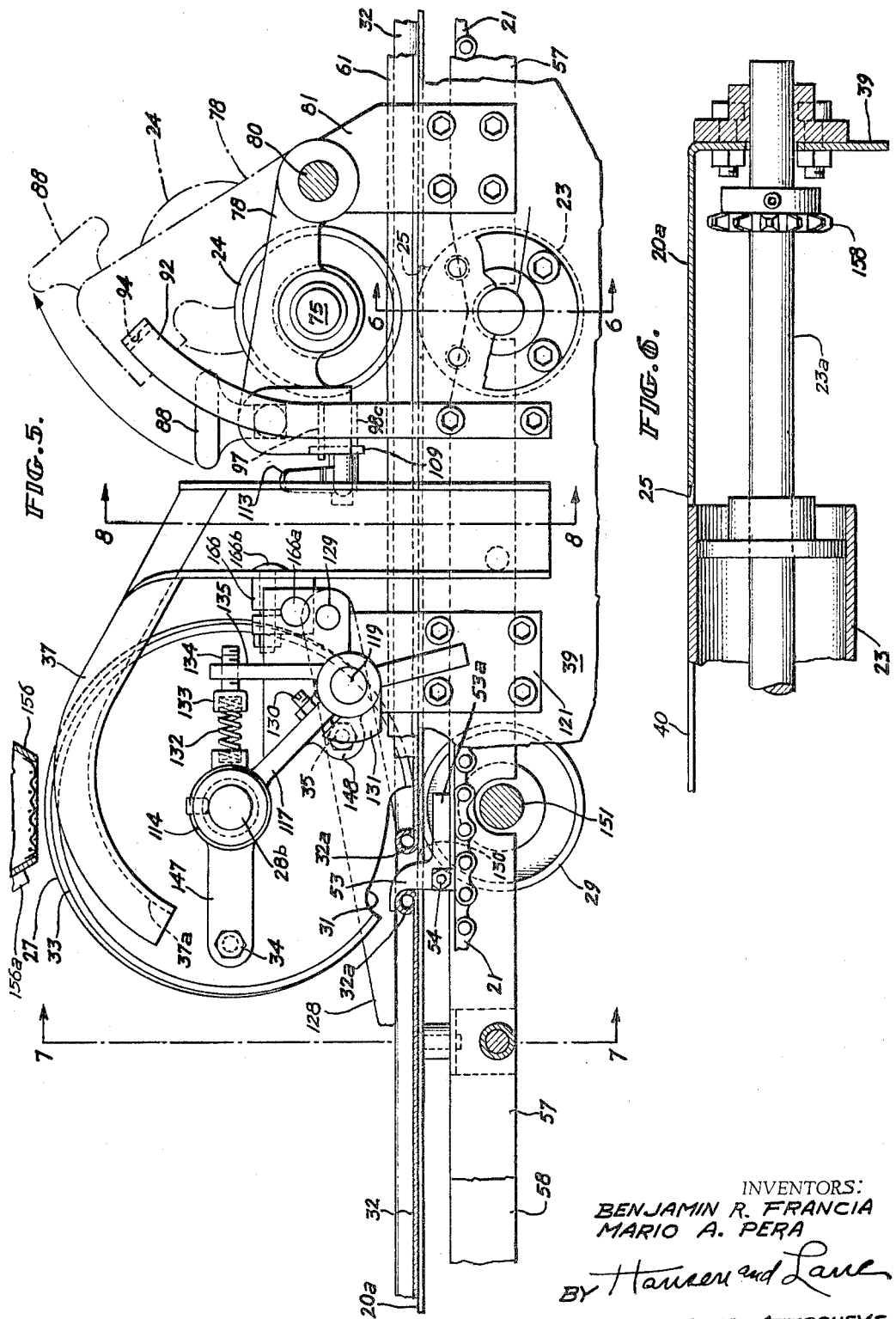

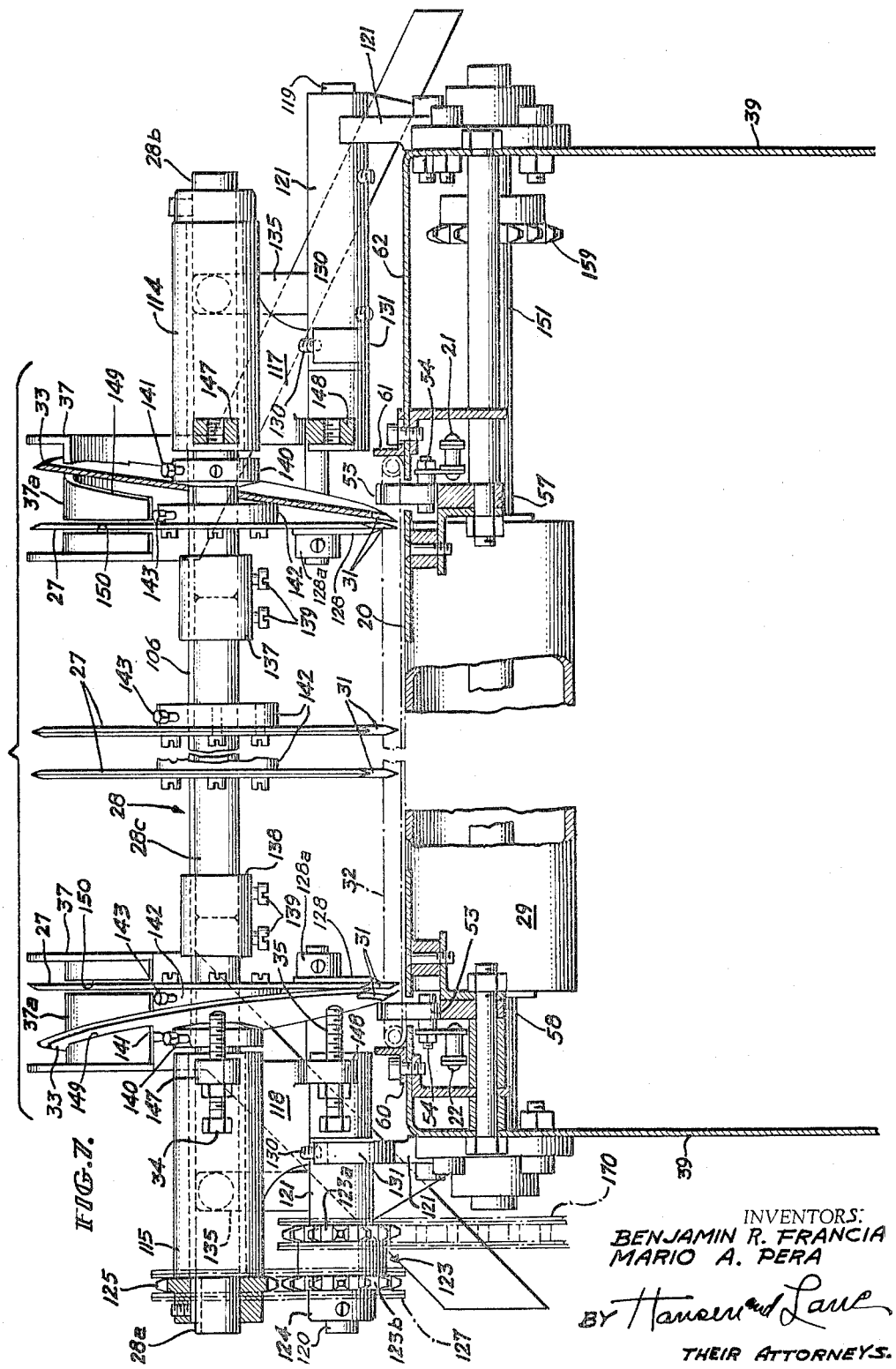

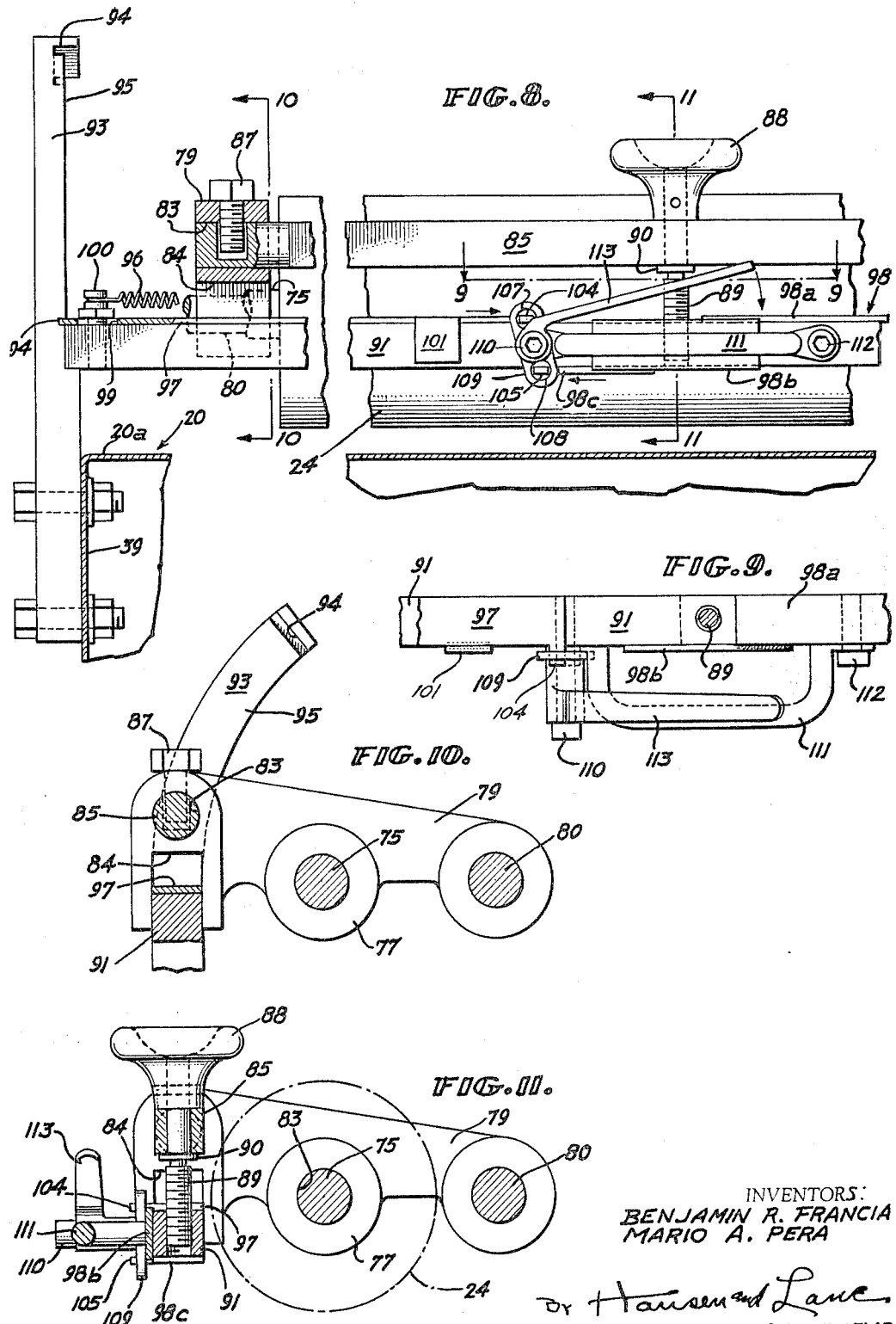

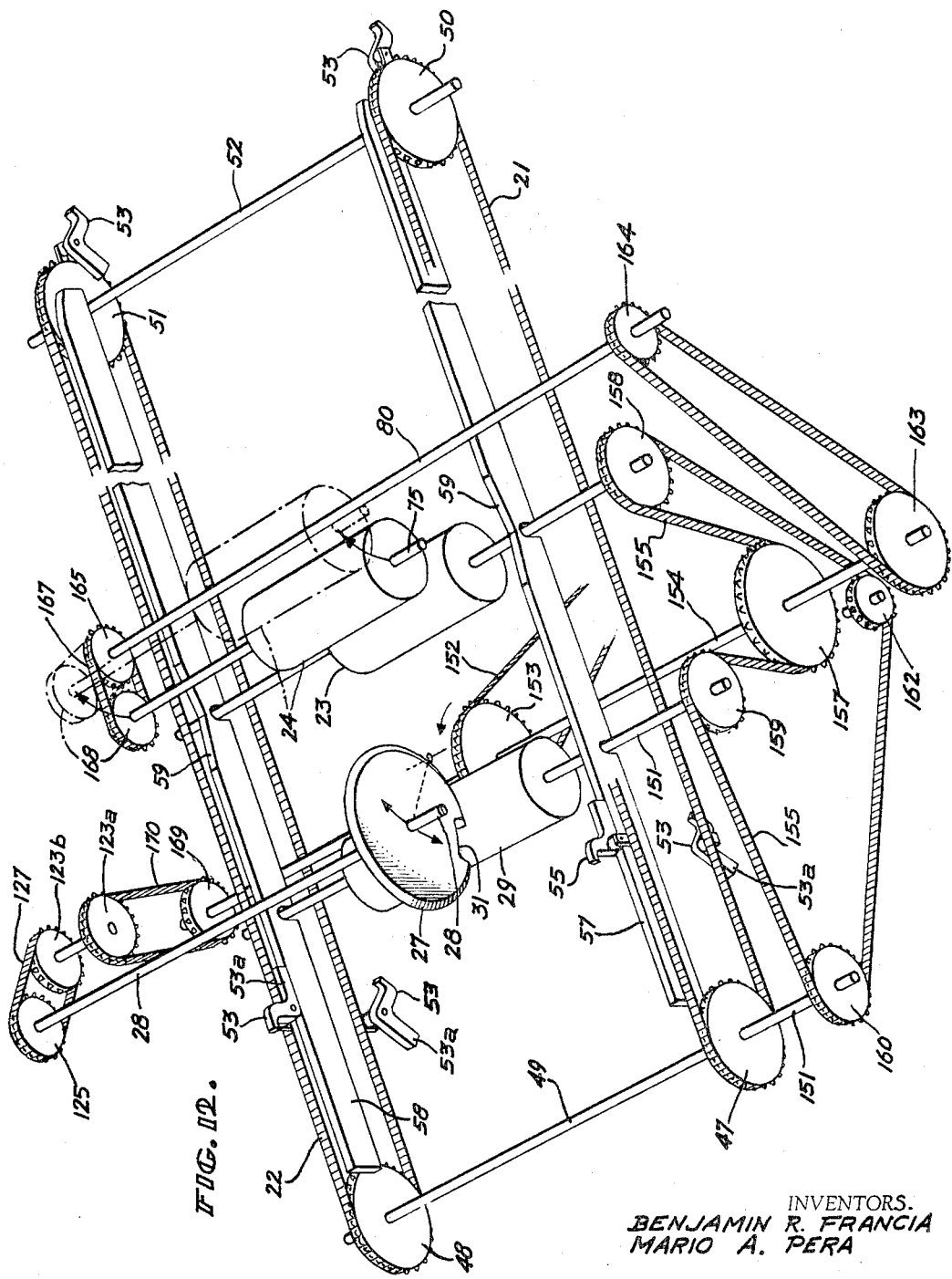

3,274,956
FRENCH ROLL DOUGH PROCESSING MECHANISM
Benjamin R. Francia, 1530 De Anza Way, and Mario A. Pera, 1728 Sweetbriar Drive, both of San Jose, Calif.
Filed June 26, 1964, Ser. No. 378,348
14 Claims. (Cl. 107—8)

The present invention relates to a dough processing mechanism, and pertains more particularly to a machine for making French rolls, which rolls can be produced in either normal, round cross sectional form, or in a flattened form particularly adapted for the making of steak sandwiches.

In the past, various types of mechanisms have been produced for the processing of bread dough for the making of loaves and rolls, but most of such prior art machines have lacked effective end trimming mechanisms, and frequently have failed to produce a uniform product. Furthermore, such prior art machines have not been adapted for the producing of a flattened roll for use in making steak sandwiches alternately with regular style unflattened French rolls.

The present invention has for its object the provision of an improved and simplified French roll making mechanism, and one which is capable of producing French rolls either in full rounded usual form, or in a flattened form for use in making steak sandwiches.

Another object of the invention is to provide a French roll making mechanism wherein a conveyor equipped bed is provided for advancing successive pans filled with elongated rolls of dough beneath a presser roller, and thereafter beneath a plurality of slicing disks which slice rolls of dough in the pans into suitable lengths for the making of French rolls, with a pair of angularly disposed end trimming and dough pick-up disks at each end of the mechanism.

A further object of the invention is to provide a French roll making machine having improved pressing, dividing and end trimming mechanism for pressing rolls of dough to a required thickness, severing the rolls into suitable lengths for the making of French rolls, and trimming the ends thereof.

A further object of the invention is to make a French roll making mechanism wherein a plurality of disk-like knives are mounted on a removable mandrel, each of the knives being provided with a notch therein to clear the ends of successive pans therebeneath, the circumference of each of the knives being equal to the center-to-center length of successive dough pans advanced therebeneath by a conveyor.

A further object of the invention is to make an improved and simplified French roll making mechanism.

These, and other objects and advantages of the invention, will be apparent from the following description and the accompanying drawings, wherein:

FIG. 1 is a plan view of a dough processing mechanism embodying the present invention.

FIG. 2 is an enlarged, exploded perspective view of the latch members for retaining the presser roll in vertically adjusted position.

FIG. 3 is a side elevational view of the mechanism shown in FIG. 1.

FIG. 4 is a left hand end view of FIG. 4.

FIG. 5 is an enlarged, fragmentary, side elevational view of the upper left central portion of FIG. 2, showing the rolling and slicing mechanism, portions being broken away.

FIG. 6 is a sectional view taken along line 6—6 of FIG. 5.

FIG. 7 is a sectional view taken along line 7—7 of FIG. 5, the central portion thereof being broken away.

FIG. 8 is a fragmentary, sectional view taken along line 8—8 of FIG. 5, portions thereof being broken away.

FIG. 9 is a fragmentary, sectional view taken along line 9—9 of FIG. 8.

FIG. 10 is a fragmentary, sectional view taken along line 10—10 of FIG. 8.

FIG. 11 is a fragmentary sectional view taken along line 11—11 of FIG. 8.

FIG. 12 is a diagrammatic, perspective view of the drive mechanism for actuating the various parts of the illustrative mechanism.

Briefly, a dough processing mechanism A embodying the invention comprises a smooth, flat, horizontal table 20 with a pair of conveyor chains 21 and 22 operating lengthwise thereon. A lower, pan-supporting roller 23, and an overlying, adjustable, dough-presser roller 24, are mounted in a first gap 25 provided in the top 20a of the table 20, and a plurality of cutter disks 27 are mounted in axially spaced relation on a shaft 28 over a second pan-supporting roller 29 mounted in a second gap 30 in the table top 20a.

Each of the cutter disks 27 is provided with a peripheral notch 31 therein to clear the adjacent end rims of successive dough pans 32 as they are carried along the table 20 by the conveyor chains. A dough pick-up disk 33 is mounted for limited wobble movement outside of each endmost cutter disk 27, and two presser fingers 34 and 35 tilt these wobble disks so that end portions trimmed from dough rolls B are carried upwardly and over, and are deposited in gravity discharge troughs 37 provided therefor.

For making ordinary French rolls of the well known rounded type, the presser roller 24 is swung upwardly to its inoperative dot-dash line position of FIG. 5, in which position it clears the dough rolls B being conveyed therebeneath, so that the trays of dough rolls are conveyed to the cutter disks in their full, rounded, unflattened form. When, however, it is desired to make flat French rolls of a type particularly suited for use in making steak sandwiches in restaurants, the presser roller 24 is lowered and latched in its solid line position of FIG. 5, in which position it flattens the dough rolls passing therebeneath before they are carried beneath the cutter disks.

Referring to the drawings in greater detail, the illustrative mechanism A comprises the elongated table 20, with conventional support legs 38 and metal side plates 39. The working portion of the table top 20 comprises flat plate portions 40, 41 and 42 (FIG. 1) mounted in horizontally aligned relation to provide the gaps 25 and 30 therein for the presser roller 24 and cutter disks 27, respectively. As illustrated, a recess 43 may be provided at the discharge end of the table to receive a conventional takeoff conveyor 44, FIG. 3, by means of which the trays of processed dough rolls may be transferred to a desired destination.

The conveyor chains 21 and 22 are mounted one along each side of the dough processing portion of the table top 20, and are passed around a pair of head sprockets 47 and 48 respectively. These sprockets are mounted on a driven shaft 49 at one end of the table top 20 (FIGS. 1, 3 and 12). The chains 21 and 22 are also passed around a pair of tail sprockets 50 and 51, respectively, mounted on an idler shaft 52 at the opposite end of the table top. A plurality of laterally opposite pairs of pan engaging hooks 53 (FIGS. 1, 3, 5, 6 and 12) are mounted at spaced intervals on the conveyor chains 21 and 22, each hook being mounted for free 360° pivotal movement on a horizontal pivot pin 54 mounted on a bracket 55 on the inward side of its respective conveyor chain. Each of these conveyor hooks has a weighted tail portion 53, substantially heavier than the pan engaging hook portion thereof, so that when unsupported these hooks will gravitate downwardly about their pivots to substantially the position shown in the lower, return runs of the chains in FIGS. 3 and 12.

A pair of hook supporting rails 57 and 58 are provided lengthwise of the table top, on the inward side of the conveyor chains 21 and 22, respectively. These rails support the weighted tail portions 53a of the hooks and guide them along the table top during the upper pan-feeding run of their chains.

A slight depression 59 is provided in each of the hook positioning rails 57 and 58 beneath the presser roller 24 to permit the presser roller to depress these hooks slightly when passing therebeneath and thus avoid possible injury to the hooks or pans engaged thereby. The effective distance between successive, laterally opposite pairs of pan engaging hooks 53 is substantially equal to the circumference of the cutter disks 27, and the cutter disk shaft 28 is timed to make one complete revolution during the passage of each successive pair of hooks 53 therebeneath.

For guiding the dough pans 32 during their progress along the table top 20a an angle iron guide strip 60 is fixedly mounted along one side of the table top, while a laterally adjustable guide strip 61, which also may be of angle iron, is provided on a lateral extension 62 of the table top outwardly beyond the conveyor chain 21.

This adjustable guide strip 61 is provided with three guide pins 63, 64 and 65, secured thereto and extending downwardly through three respective transverse slotted openings 67, 68 and 69 (FIG. 1) provided in the table top extension 62. These guide pins pass also through longitudinally extending slots provided therefor in the longer arms of three bell crank levers 70, 71 and 72 which are pivotally mounted on the under side of the table top extension 62.

The short arm of each of the bell crank levers has a pivot pin in its outer end which is threadedly connected to a threaded rod 73, journaled to extend lengthwise beneath the table top extension 62.

A handle 74 provided on a projecting end portion of the threaded rod 73 permits the rod to be turned in either direction as required to adjust the bell crank levers 70, 71 and 72 and thereby the position of the adjustable guide strip 61.

Presser roller

The presser roller 24 and its associated, underlying support roller 23 are centered in the gap 25 provided therefor between the table top plates 40 and 41. The support roller 23 is mounted on a shaft 23a (FIG. 6) which is journaled beneath the table top in a pair of axially aligned bearings 75, one of which is mounted on each of the table side plates 39. The support roller 23 is mounted below, and tangent to the common upper surface of the table top plates 40, 41 and 42, and directly beneath the presser roller 24. The support roller 23 is driven at the same surface speed as, and in the opposite rotative direction from, the presser roll 23, as shown in FIG. 12 and described later herein in conjunction with the drive mechanism as a whole.

The presser roller 24 is mounted on a shaft 75 journaled in bearing bosses 77 (FIGS. 10 and 11) provided substantially medially of the length of a pair of similar, but reversed, support arms 78 and 79. These support arms are journaled on a support shaft 80 which is mounted in a pair of similar but opposite brackets 81 and 82, one of which is secured to each of the table side plates 39.

As best shown in FIG. 1, the support shaft 80 extends the full width of the table top, including the extension side plate portion 62, while the support arms 78 and 79 are mounted one at each side of the working area of the table which lies between the conveyor chains 21 and 22. A somewhat similar mounting arrangement is provided for the cutter disks 27, and provides for extending the width of the working area of the table in the event such procedure should ever be required. Such widening could be effected by increasing the length of the presser roller and cutter disk assemblies and their associated support rollers, but since such widening is not material to the present invention it will not be described or illustrated herein.

In the free end of each of the presser roller support arms 78 and 79 there is a hole 83 and also a downwardly opening notch 84 best shown in FIG. 10. A square tie rod 85 having the end portions thereof rounded, as best shown in FIG. 8, has these round end portions fitted into the holes 83 in the free ends of the support arms 78 and 79, and secured therein by set screws 87.

A knob 88 is secured co-axially onto the upper end portion of a presser roller adjusting screw 89, having a retaining collar 90 formed integrally thereon, an unthreaded shank portion of this screw being journaled in a hole provided therefor through the center of the square tie rod 85.

The threaded lower portion of this adjusting screw 89 is screwed through a threaded hole provided therefor in a square latch rod 91, which rides in the downwardly opening notches 84 in the free ends of the presser roller support arms 78 and 79. The ends of the latch rod 91 extend laterally beyond the arms 78 and 79, and ride in recesses 94 provided therefor along the inner faces of the curved upper portions of a pair of similar but opposite latch brackets 92 and 93, one of which is affixed to each of the table side plates 39. The curved upper portions of the brackets 92 and 93 are curved co-axially with the rod 80 upon which the support arms 78 and 79 are journaled. Latch notches 94 are provided one at each end of recesses 95 in the brackets 92 and 93 in position to receive the outer ends of a pair of latch plates 97 and 98, shown in separate detail in FIG. 2, and in assembled relation on the latch rod 91 in FIGS. 8–11. The latch plates 97 and 98 are mounted for slidable movement along the upper and lower sides, respectively, of the square latch rod 91.

A slotted opening 99 is provided near the outer end of the latch plate 97, and a screw 100, threaded into the square latch rod 91, rides in this opening to permit lengthwise movement of the latch plate 97 along the upper surface of the latch rod 91. A tongue 101, extending downwardly from an edge of the latch plate 97, rides along a side of the square latch rod 91 to prevent displacement of the latch plate 97. A coil spring 96 is connected in tension between the screw 100 and a pin 96a on the latch plate 97 to urge the latter outwardly toward latched condition.

The other latch plate 98 has a major outer portion 98a thereof which rides along the upper surface of the square latch rod 91, and a slotted hole 102 adjacent the outer end of this outer portion 98a rides on a screw 103, screwed into the latch rod 91 in a manner similar to that described for the hole 99 and screw 100, of the other latch plate 97. At the inner end of the latch plate portion 98a a vertical plate portion 98b is secured thereto to span the height of the latch rod 91, and a bottom plate portion 98c is secured to the lower inner edge portion of this upright plate portion 98b to ride along the under side of the square latch rod 91.

A pair of tabs 104 and 105 are provided on the inner ends of the latch plate 97 and the bottom plate portion 98c, respectively, and these tabs are inserted in a pair of holes 107 and 108 best shown in FIG. 8 in a plate 109, which is pivoted medially of its length on a pivot pin 110 screwed into the side of the square latch rod 91. This pivot pin 110 also anchors one end of a handle loop 111 to the latch rod, the other end of this handle loop being secured to the latch rod 91 by a screw 112.

A latch actuating lever arm 113 is fixedly secured to the pivoted latch plate 109, so that by depressing the lever arm 113 as indicated by the arrow in FIG. 8, the latch plates 97 and 98 are withdrawn inwardly clear of their notches 94 in the curved side brackets 92 and 93 to thereby free the presser roller 24 for up or down swinging movement about its support rod 80 as an axis. Upon releasing the latch lever 113 when the spring biased latch plates 97 and 98 are moved into registry with one of the notches 94 in the curved brackets 92 and 93, the spring 96 urges them outwardly into latch engagement therewith.

Turning the presser roller adjusting knob 88 in a selected direction screws the threaded lower portion of the screw 89 into or out of the square latch rod 91 as required, and thus raises or lowers the notched ends of the presser roller support arms 78 and 79 relative to the latch rod. Since the position of the latch rod 91 in its lowered, latched position is fixed by the position of the latching notches 94 at the lower ends of the recesses in the curved brackets 92 and 93, such adjusting movement adjusts the height of the presser roller 24 in its lowered, operative position.

*Cutting and trimming disks*

The cutter disks 27 and dough pick-up wobble disks 33 are keyed by conventional keys 106 (FIG. 7) to the rotatably driven, three-part shaft assembly 28 journaled in bearings 114 and 115 provided on the free ends of a pair of similar, but opposite, disk mounting arms 117 and 118. These arms are mounted for pivotal adjustment on a pair of axially aligned pivot pins 119 and 120 provided one in each of a pair of support brackets 121 and 122 secured to opposite sides of the table 20. The support brackets 121 and 122 are generally similar, but opposite, to each other, with the exception that the right hand support bracket 122, as shown in FIG. 7, has an elongated bearing portion so as to position the cutter disk mounting arm 118 pivotally mounted thereon inwardly adjacent the working area of the table top. A double sprocket 123 is journaled on an extending portion of the pivot pin 120, and is retained thereon by a collar 124.

A cutter disk shaft end portion 28a is journaled in the bearing 115 of the disk mounting arm 118, and a sprocket 125 secured on the outer end of this shaft portion 28a is driven by a chain 127 passed around this sprocket and also around one half of the double sprocket 123. A similar shaft end portion 28b is journaled co-axially with the shaft end portion 28a in the bearing 114 of the other cutter disk support arm 117. A pair of similar, but reversed, stripping blades 128, best shown in FIGS. 5 and 7, are provided with collars 128a which are mounted on studs 129 (FIG. 5) mounted one on each of the cutter disk support brackets 121. These dough stripping blades ride along the inner sides of the outermost cutter disks as the latter rotate and strip them clean of any dough which may tend to adhere thereto.

Vertical adjustment of the cutter disk shaft 28 and the cutter disks mounted thereon is accomplished by screws 130 (FIGS. 5 and 7) threaded one through each of the cutter disk mounting arms 117 and 118, and bearing against abutments 131 on their respective support brackets 121 and 122. Adjustable, resilient downward pressure is maintained on the cutter disk mounting arms 117 and 118 by two similar compression springs 132 (best shown in FIG. 5) one end of each of which is in compressive engagement with its associated disk mounting arm 117 and 118, while the other end is seated in a socket 133 on the end of a pressure adjusting screw 134 screwed into a hole provided therefor in the upper end of an arm 135 on each bracket 121 and 122.

The cutter disk shaft 28 comprises, in addition to the shaft end portions 28a and 28b, a replaceable intermediate shaft portion 28c having cutter disks 27 mounted at desired spaced intervals thereon. Coupling sleeves 137 and 138 (FIG. 7) receive adjoining ends of the shaft end portions 28a and 28b and the center shaft portion 28c in fitted relation therein, and set screws 139 secure the shaft portions therein. By releasing the set screws 139 and sliding the coupling sleeves axially clear of the adjoining ends of the shaft portions therein, the center shaft portion 28c with its cutter disks thereon can be removed for maintenance or for replacement by another similar shaft portion having cutter disks spaced at different intervals thereon.

A retaining collar 140 (FIG. 7) for each dough pick-up wobble disk 33 is mounted on each shaft end portion 28a and 28b, and is secured in adjusted position thereon by a set screw 141. Each pick-up disk 33 has an axial opening therein of a size to permit free wobble movement of the disk on the shaft 28.

The cutter disks 27 are spaced axially from each other by the desired length of portions into which the dough rolls B are to be cut. Each cutter disk has a hub portion 142, which is fitted onto the center shaft portion 28b and is secured in axially adjusted position thereon by a set screw 143. For changing the length of dough portions to be cut by the disks 27, replacement intermediate shaft portions 28c may be provided, each having the cutter disks arranged at required axial intervals thereon.

Each wobble disk 33 and cutter disk 27 is provided with a peripheral notch 31 therein of a size to receive the end rims 32a (FIG. 5) of endwise adjacent dough pans 32 being conveyed along the table top 20a by the conveyor chains 21 and 22. The cutter disks 27 are of substantially the same circumference as the distance between the forward faces (FIG. 5) of longitudinally adjacent pairs of conveyor hooks 53, and rotation of the cutter disk shaft 28 is so timed that the disks thereon are rotated to receive in their notches 31 the endwise adjacent rims of successive pans being conveyed along the table top.

The wobble disks 33 are of slightly less diameter than the cuter disks 27, and while the latter have their peripheral edges sharpened so as to cut cleanly through the dough rolls passing therebeneath, the peripheral edges of the wobble disks are somewhat dull, so as not to slice through the end trimmings in which they operate. Each wobble disks 33 is adjusted at a slight acute angle relative to the cutter disk 27 adjacent which it operates by the two adjusting screws 34 and 35, which are provided with rounded ends for slidable engagement with their respective wobble disks as best shown in FIG. 7.

These wobble disk positioning screws 34 and 35 are screwed into threaded holes provided therefor respectively, in an arm 147, and an ear 148, on each of the disk mounting arms 117 and 118, and bear in endwise sliding, position-retaining relation against the outer faces of their associated wobble disks. These screws are adjusted, as best shown in FIG. 7, so as to tilt the wobble disks inwardly toward their lower, rear quadrants. Thus, as each outermost cutter disk trims off an end portion of a dough roll B passing therebeneath, its associated wobble disk, which is slightly smaller in diameter, and dull, cuts into, but not through, this trimmed off end portion, and the latter is pinched and carried upwardly between the converging rearwardly and upwardly moving portions of each associated pair of cutter and wobble disks. Continued rotation of these disks carries the severed end portion upwardly and then over between the disks to a position where it is brought over the arched bottom portion 37a of a gravity discharge trough 37, one of which is provided for each associated pair of cutter and wobble disks. Each dough discharge trough has a split block 166 (FIG. 5) thereon which is mounted on a stud 156a provided therefor on the bearing support bracket 121, and is clamped in adjusted position thereon by a bolt 156b.

The bottom of each curved trough 37 is provided with two slits 149 and 150 (FIG. 7) each of a width, and at a required angle, to receive therein with slight lateral clearance a wobble disk 33 and its associated cutter disk 27 as best shown in FIG. 7. The discharge trough bottom 37a curves forwardly on a larger radius of curvature than its associated disks 27 and 33, as best shown in FIG. 5, so that as the trough bottom passes radially beyond the peripheries of the rotating disks it strips the dough trimmings from the disks. The trough bottom 37a where this stripping action occurs slopes downwardly and then laterally outwardly, so that the dough trimmings are pushed therealong by succeeding ones, and, assisted by gravity, are discharged laterally outwardly of the machine. There they may be caught in any suitable container and reprocessed, since they are not contaminated in any way.

A suitable flour sifter 156 is mounted above each trough 37 and is filled with suitable flour, for example rice flour, to prevent the dough from sticking to the chutes. Suitable means such as a conventional electric vibrator 156a is mounted to agitate each sifter to provide a constant sifting of the flour during operation of the mechanism.

The support roller 29 (FIG. 7) for the cutter disks is mounted on a shaft 151 below, and substantially tangent to, the upper surface of the table top 20a, and is driven at a circumferential speed substantially equal to the circumferential speed of the cutter disks 27 directly thereabove.

The drive mechanism (FIG. 12) for the illustrative mechanism A, comprises a drive chain 152, driven by a suitable prime mover (not shown) such as, for example, an electric motor of suitable speed and horsepower. The chain 152 passes around a sprocket 153 secured to a jack shaft 154 and drives the latter in the direction indicated by the arrow. A chain 155 passes around the under side of a sprocket 157 secured to the jack shaft 154, and also passes over a pair of sprockets 158 and 159 secured, respectively, to the shafts of the presser roller support roller 23 and the cutter disk support roller 29. This same drive chain 155 also passes around a sprocket 160 secured to the head shaft 161 for driving the conveyor chains 21 and 22. The same chain 155 also passes beneath an idler sprocket 162, which may be provided with conventional slack take up means (not shown) if desired. A sprocket 163 is also secured on the jack shaft 154, and a chain 163a is passed around this sprocket 163 and a sprocket 164 on the shaft 80 to drive the latter. A sprocket 165 is also provided on the other end of the shaft 80, and drives a short chain 167 which also passes around a sprocket 168 secured on the presser roller shaft 75 to drive the presser roller 24. This permits free pivotal adjustment of the presser roller support arms 78 and 79 about their supporting shaft 80 as an axis without disturbing the drive to the presser roller itself.

A somewhat similar drive arrangement is provided for driving the cutter and wobble disks 27 and 33, and comprises a sprocket 169 secured on the opposite end of the jack shaft 154 from the sprocket 163. The sprocket 169 drives a chain 170 which also passes around one-half 123a of the double sprocket 123 (FIGS. 7 and 12). The short drive chain 127 passes around the other half 123b of this double sprocket 123, and also around the sprocket 125 on the cutter disk shaft 28. The directions of rotation of various sprockets of FIG. 12 are indicated by the arrows, and the ratios of the various sprockets is such that the surface or peripheral speeds of the presser roller 24, the presser support roller 23, the cutter disk support roller 29 and the cutter disks 27 are all substantially equal to the linear speed of the conveyor chains 21 and 22.

In using the mechanism A, dough to be processed is made in a conventional manner for making French rolls, and is formed into elongated rolls B of a diameter desired for the French rolls to be made therefrom. These dough rolls are placed in pans 32 in side by side relation to extend transversely of the table top 20a, each of the pans being of a width to fit slidably between the guide strips 60 and 11, and of a length to extend from one pair of pan engaging hooks 53 on the conveyor chains 21 and 22 to the next, thereby to position the leading edge of each pan sufficiently close to the trailing edge of the pan directly ahead of it so that the leading and trailing rims 32a of adjacent pans will fall within the notches 31 of the disks 27 and 33 upon successive rotations of the disk shaft 28.

If it is desired to make conventional, rounded French rolls, the presser roller 24 is swung upwardly to its broken line, inoperative position of FIG. 5 by means of the handle 111, after first depressing the latch release lever 113 to withdraw the latch plates 97 and 98 from their respective notches at the lower ends of the recesses 95 in their curved side brackets 92 and 93. In this raised, inoperative position of the presser roller 24, the pans of dough rolls B pass freely therebeneath without being contacted by the presser roller.

As the pans of dough rolls proceed through the mechanism, they are conveyed beneath the cutter disks 27, which slice cleanly through the dough rolls to divide each one into a plurality of severed portions, each of a length equal to the axial spacing between adjacent cutter disks. The outermost cutter disks trim the end portions from the dough rolls, and the end trimmings are pinched between the cutter disks which severed them from the dough roll, and their adjacent wobble disks 33, and are carried upwardly and over until they are stripped free of the disks by engagement with the bottom of the discharge trough 37 as explained previously herein. The flour sifters 156 keep the troughs covered with a light deposit of flour to prevent sticking.

When it is desired to make the flattened type of steak sandwich rolls, the presser roller 24 is lowered by means of the handle 111, upon release of the latch plates 97 and 98 by means of the lever 113, until the rectangular latch rod 91 is arrested by engaging the lower ends of the recesses 95 in the curved side brackets 92 and 93. Upon release of the latch lever 113, the latch plates 97 and 98 are urged by their biasing spring 96 into latched engagement with their notches 94 at the lower ends of the arcuate recesses 95. Final adjustment of the lowered position of the presser roll 24 is made by means of the adjusting screw knob 88 as explained previously herein.

With the presser roller 24 in its lowered, adjusted position, as the pans 32 of dough rolls B pass therebeneath, the dough rolls are flattened to a desired thickness by the presser roller 24, the underlying support roller 23 supporting the pans. As mentioned previously herein, the presser roller and its support roller are both rotated at the same surface speed as the forward travel of the conveyor chains 21 and 22, and in directions to move the surfaces thereof which engage the rolls and pan, respectively, in the same direction as the movement thereof by the conveyor chains.

After passing beneath the presser roller 24, the dough rolls are carried beneath the disks 27 and 33, where they are cut by the cutter disks into desired lengths and the end portions trimmed therefrom in the same manner as explained previously herein for the unflattened dough rolls.

To prevent damage to the pans or the conveyor hooks 53 when the latter pass beneath the presser roller 24, the depressed portions 59 of the conveyor hook support rails 58 permit the hooks to be depressed downwardly slightly as shown in FIG. 5.

As each pan 32 is conveyed off the discharge end of the table 20, for example onto a take off conveyor 44, the conveyor hooks 53 propelling the pan ride off the ends of the rails 57 and 58, whereupon the weighted tail portions 53a cause the hooks 53 to gravitate to a suspended position as shown by the hooks on the lower or return run of the chains 21 and 22 as shown in FIG. 3. When the thus suspended hooks are again carried upwardly over the tail sprockets 50 and 51 the weighted tail portion of each hook rides onto the entrance end of its associated rail 57 or 58 as the case may be to again bring the hook into pan-engaging position.

The invention provides a simple, sturdy and effective mechanism for making French rolls, either in a normal rounded form, or in flattened form for use as steak rolls. The mechanism is of extremely high capacity, and is readily maintained in a clean and sanitary condition. The presser roller 24 can be accurately adjusted when in its lower operative condition by means of the adjusting knob 88, as can also the cutter disks 27 by means of the screws 127. The mechanism is, except for the feeding of the pans onto the table top 20a, completely automatic, and it is obvious that if desired the pans can be fed onto the table top by a conventional conveyor, for example the same type as the take-off conveyor 44. Since these and other modifications are not features of the invention, and are well within the capabilities of a routine worker in the art, they are not illustrated or described herein.

While we have illustrated and described a preferred embodiment of the present invention, it will be understood, however, that various changes and modifications may be made in the details thereof without departing from the scope of the invention as set forth in the appended claims.

Having thus described the invention, what we claim as new and desire to protect by Letters Patent is defined in the following claims:

1. A dough processing mechanism for making French rolls comprising
   a frame,
   a conveyor for moving dough pans in aligned, end-to-end relation in a path along the frame,
   a plurality of rotary cutter disks mounted co-axially and in axially spaced relation above the path of the pans with the peripheries of the cutter disks positioned to cut through dough products on the pans, each of the cutter disks having a notch in its periphery to receive the ends of adjacent pans therein, and
   dough pick-up means mounted on the axially outward side of each endmost cutter disk to pick up end trimmings cut by each endmost cutter disk from such dough products.

2. A dough processing mechanism for making French rolls comprising
   a frame,
   a conveyor for moving dough pans in aligned, end-to-end relation in a path along the frame,
   a presser roller mounted for vertical adjustment above the path of the pans along the frame,
   a plurality of rotary cutter disks mounted co-axially and in axially spaced relation above the path of the pans with the peripheries of the cutter disks positioned to cut through dough products on the pans, each of the cutter disks having a notch in its periphery to reecive the ends of adjacent pans therein,
   dough pick-up means mounted adjacent the axially outward side of each endmost cutter disk to press end trimmings cut by the endmost cutter disks from such dough products against the outward side of each endmost cutter disk for elevation thereby, and
   means for stripping such end trimmings from the endmost cutter disks after elevation thereby.

3. A dough processing mechanism for making French rolls comprising
   a frame,
   a conveyor for moving dough pans in aligned, end-to-end relation in a path along the frame,
   a presser roller mounted for vertical adjustment above the path of the pans along the frame,
   a plurality of rotary cutter disks mounted co-axially and in axially spaced relation above the path of the pans with the peripheries of the cutter disks positioned to cut through dough products on the pans,
   a stripper blade in dough stripping engagement with the inner face of each axially outward cutter disk, and
   dough pick-up means mounted on the axially outward side of each endmost cutter disk to pick up end trimmings cut by the endmost cutter disks from such dough products.

4. An arrangement according to claim 3 wherein the dough pick up means comprises a dough pick up disk mounted adjacent each outermost cutter disk and disposed at a slight acute angle thereto, thereby to pinch the end trimmings between each dough pickup disk and the cutter disk adjacent thereto.

5. An arrangement according to claim 4 wherein each dough pick up disk is of slightly smaller diameter than the cutter disks so as not to slice through dough end trimmings engaged by the dough pick up disks.

6. An arrangement according to claim 3 wherein each angularly disposed pick up disk is mounted in driven engagement with, but free for wobble movement relative to the cutter disk adjacent thereto, and positioning means engaging a side of each pick up disk to maintain it at a slight acute angle to the cutter disk adjacent thereto.

7. An arrangement according to claim 6 wherein the positioning means engaging a side of each pick up disk comprises a pair of screws threadedly engaging a relatively stationary member and with their ends in positioning sliding engagement with a side of each pick up disk.

8. A dough processing mechanism for making French rolls comprising
   a frame,
   a conveyor for moving dough pans in aligned end-to-end relation in a path along the frame,
   a plurality of rotary cutter disks mounted co-axially and in axially spaced relation above the path of the pans with the peripheries of the cutter disks positioned to cut through dough products on the pans, each of the cutter disks having a notch in its periphery to receive the ends of adjacent pans therein,
   a dough pick-up wobble disk mounted on the axially outward side of each endmost cutter disk,
   and means for retaining each wobble disk at a slight, acute angle to its associated endmost cutter disk to pinch therebetween, and thereby pick up end trimmings cut by each endmost cutter disk from dough rolls on the pans.

9. An arrangement according to claim 8 wherein the means for retaining each wobble disk at a slight acute angle to the cutter disk inwardly thereof comprises a pair of threaded members mounted in endwise, slidable, bearing engagement with a side of each wobble disk at circumferentially separated points.

10. A dough processing mechanism for making French rolls comprising
    a frame,
    a conveyor for moving dough pans in aligned, end-to-end relation in a path along the frame, with each pan containing a plurality of dough rolls positioned with their axes extending transversely of the direction of conveyor movement,
    a presser roller mounted for vertical adjustment over the path of the pans along the frame,
    means for adjusting the height of the presser roller for flattening dough rolls on pans conveyed therebeneath along such path,
    a plurality of rotary cutter disks mounted co-axially and in axially spaced relation above such path with the peripheries of the cutter disks positioned to cut through dough rolls on the pans, each of the cutter disks having a notch in its periphery to receive the ends of adjacent pans therein, and
    dough pick-up means mounted on the axially outward side of each endmost cutter disk to pick up end trimmings cut by the endmost cutter disks from such dough rolls.

11. A dough processing mechanism for making French rolls comprising a frame,
    a conveyor for moving dough pans in slightly spaced, aligned, end-to-end relation in a path along the frame wtih each pan containing a plurality of dough rolls positioned with their axes extending transversely of the direction of conveyor movement,
    a pair of presser roller support arms pivotally mounted on a common axis on the frame, one at each side of the path of the pans therealong, a presser roller journaled on the support arms to extend therebetween, means for retaining the arms, and the presser roller journaled therein, in selected upwardly swung and downwardly swung positions, and means for adjusting the height of the presser roller relative to the means for retaining the presser roller in upwardly swung and downwardly swung positions for controlling the flattening of dough rolls on pans conveyed therebeneath by the conveyor with the support arms in their downwardly swung position.

12. A dough processing mechanism for making French rolls comprising a frame, a conveyor for moving dough pans in slightly spaced, aligned, end-to-end relation in a path along the frame with each pan containing a plurality of dough rolls positioned with their axes extending transversely of the direction of conveyor movement, a pair of presser roller support arms pivotally mounted on a common axis on the frame, one at each side of the path of the pans therealong, a tie bar interconnecting the free ends of the support arms, a presser roller journaled approximately medially of each support arm to extend therebetween and above the path of the pans along the frame, a latch bar slidably mounted on the free ends of the support arms for adjusting movement substantially perpendicularly to the arms in the direction of pivotal movement of the arms, the ends of the latch bar extending laterally beyond the support arms, a pair of latch brackets mounted on the frame, one beyond each end of the latch bar, for releasable latched engagement therewith at selected upward swung and downward swung limits of movement of the latch bar, and means for adjusting the spacing between the tie bar and the latch bar for controlling the height of the presser roller, and thereby the degree of flattening of dough rolls on pans conveyed beneath the presser roller by the conveyor, with the support arms latched in their downwardly swung position.

13. A dough processing mechanism for making French rolls comprising a frame, a conveyor for moving dough pans in aligned end-to-end relation in a path along the frame, a plurality of rotary cutter disks mounted co-axially and in axially spaced relation above the path of the pans with the peripheries of the cutter disks positioned to cut through dough products on the pans, a dough pick-up wobble disk mounted on the axially outward side of each endmost cutter disk, means for retaining each wobble disk at a slight, acute angle to the cutter disk axially inwardly thereof to pinch between the latter disks, and thereby pick up, and carry upwardly end trimmings cut by the endmost cutter disks from dough rolls on the pans, and a stripper having an end portion thereof provided with a pair of lengthwise extending slits therein fitted onto the upper portions of each endmost cutter disk and its associated wobble disk with the disks fitted into such slits to rotate therein, the stripper terminating short of the rear edges of the disks, whereby end trimmings carried upwardly between the rotating disks pass rearwardly beyond the end of the stripper and are stripped from the disks by the portions of the stripper adjacent the slits therein.

14. An arrangement according to claim 13 wherein the stripper is in the form of a trough, and the portion thereof forward of the disks slopes downwardly and outwardly to cause end trimmings therein to gravitate downwardly therealong.

References Cited by the Examiner
UNITED STATES PATENTS

| | | | |
|---|---|---|---|
| 1,319,189 | 10/1919 | Taggart | 107—8 |
| 1,565,887 | 12/1925 | Andrus | 107—8 |
| 1,566,151 | 12/1925 | Donough | 107—8 |
| 1,738,361 | 12/1929 | De Vito | 107—12 |
| 2,275,714 | 3/1942 | Anetsberger et al. | 107—12 |
| 2,574,636 | 11/1951 | Gareis | 107—8 |

WALTER A. SCHEEL, *Primary Examiner.*

R. W. JENKINS, *Examiner.*